Sept. 18, 1945.  S. J. GEDDINGS  2,384,909
LOOM
Filed March 20, 1945  2 Sheets-Sheet 1
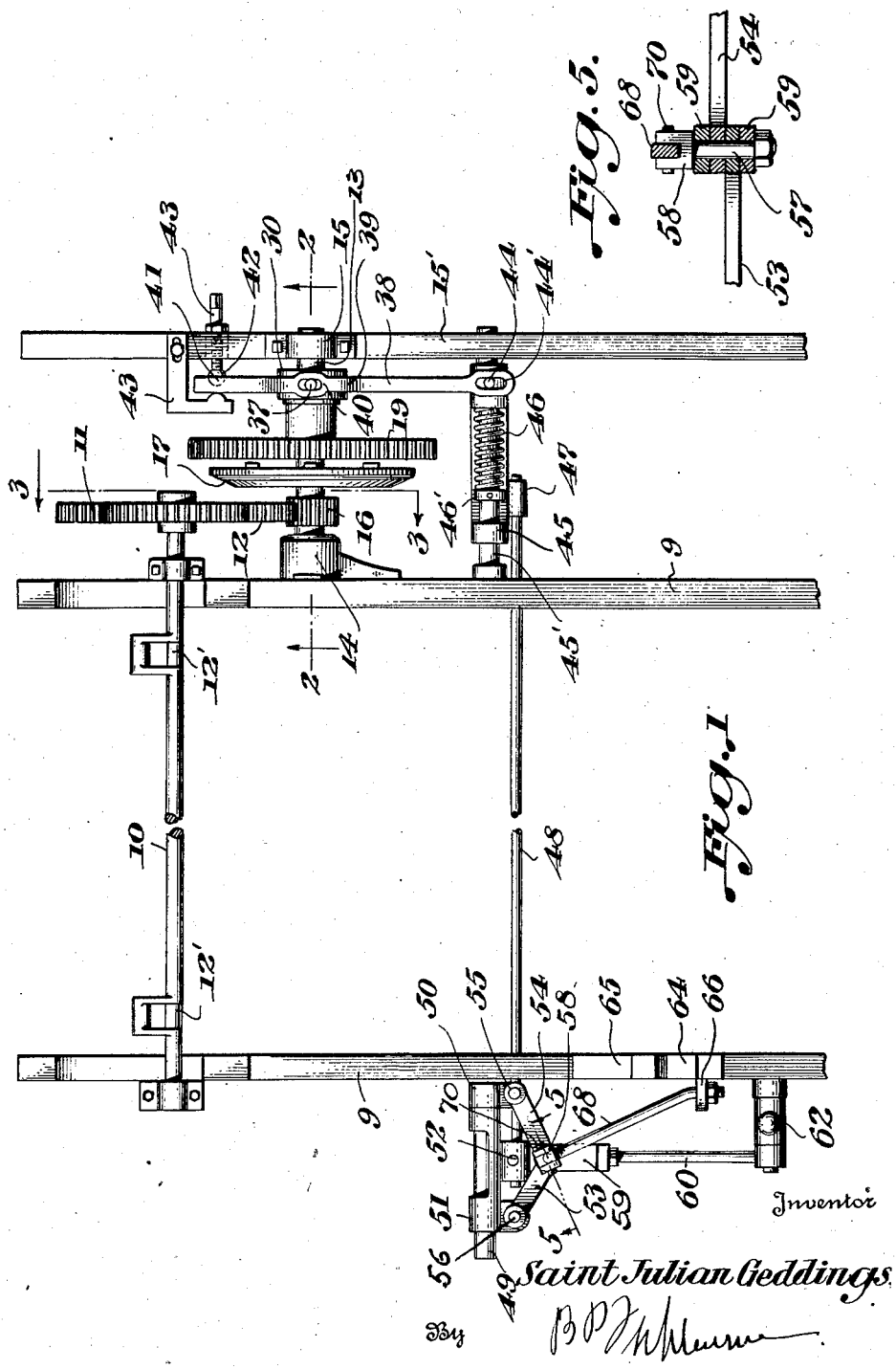
Inventor
Saint Julian Geddings
By
Attorney Sept. 18, 1945.  S. J. GEDDINGS  2,384,909
LOOM
Filed March 20, 1945  2 Sheets-Sheet 2
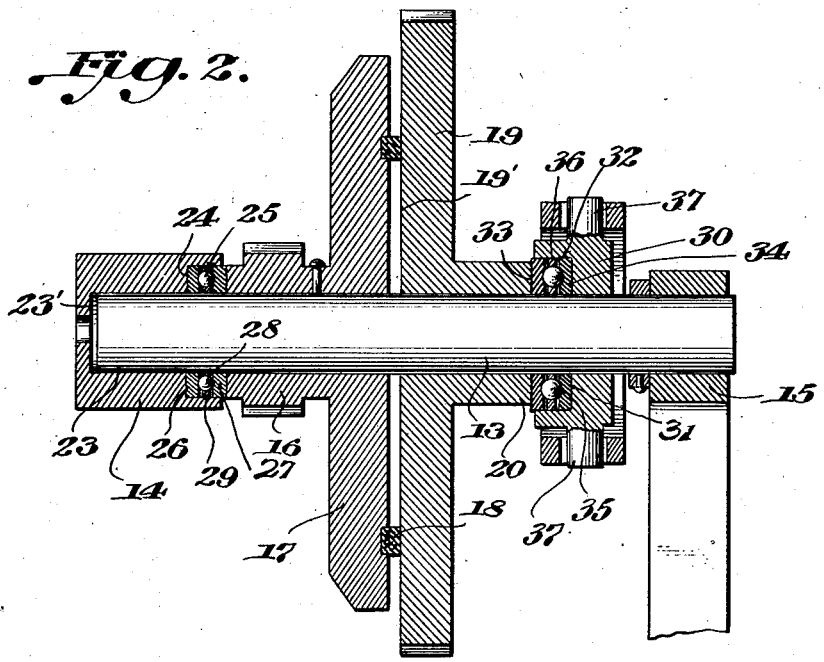
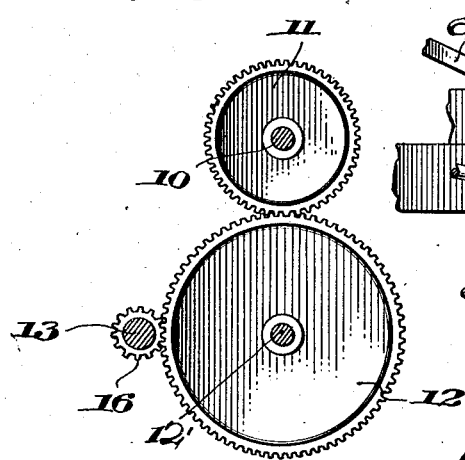
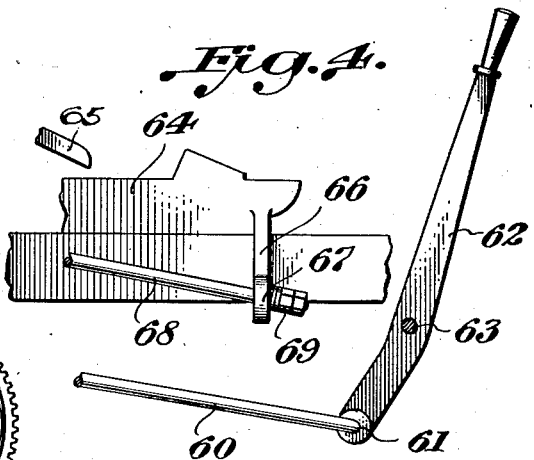
Inventor
Saint Julian Geddings,
By
Attorney Patented Sept. 18, 1945

2,384,909

UNITED STATES PATENT OFFICE 2,384,909

LOOM

Saint Julian Geddings, West Columbia, S. C.

Application March 20, 1945, Serial No. 583,684

6 Claims. (Cl. 139—336)

My invention relates to improvements in looms and has particular reference to means for operating the clutch in the driving and stopping of the loom.

An important object of the invention is to provide means for eliminating the use of the ordinary fiber washers included in the usual mechanism for shifting the clutch element, whereby the resultant disadvantages are dispensed with.

A further object of the invention is to provide means of the above mentioned character which may be properly operated when adjusted to exert a selected pressure upon the clutch.

A further object of the invention is to provide clutch shifting means which is free from a braking action.

Other objects and advantages of the invention will be apparent during the course of the following description.

In the accompanying drawings forming a part of this application and in which like numerals are employed to designate like parts throughout the same, Figure 1 is a plan view of a loom frame and crank shaft and the means for driving the crank shaft, Figure 2 is a longitudinal vertical section through the clutch and associated elements, taken on line 2—2 of Figure 1, Figure 3 is a vertical section taken on line 3—3 of Figure 1, Figure 4 is a side elevation of a shipper lever and frog, and, Figure 5 is a vertical section taken on line 5—5 of Figure 1.

In the drawings, wherein for the purpose of illustration is shown a preferred embodiment of my invention, the numeral 9 designates frame sides. Suitably mounted upon the frame sides is the usual transverse horizontal crank shaft 10, which operates the lay, and a gear 11 is rigidly mounted upon one end of the crank shaft 10 upon the outer side of the adjacent frame side 9. The gear 11 engages a gear 12, rigidly mounted upon a transverse horizontal shaft 12' which operates the cams and pick motion.

The drive is applied to the gear 12 by means of driving mechanism comprising a horizontal transverse shaft 13 journalled in bearings 14 and 15. The bearing 14 is rigidly mounted upon the loom side 9 and the bearing 15 is mounted upon an auxiliary support 15' or any other suitable means. The shaft 13 is disposed outwardly of the loom side 9 and is parallel with the shafts 10 and 12'. The shaft 13 has a small gear 16 rigidly mounted thereon, in permanent mesh with the gear 12.

A clutch is provided to drive the gear 16, including a friction disc 17 rigidly mounted upon the shaft 13. This friction disc may be integral with the gear 16, if desired, but the invention is in no sense restricted to this feature. The friction disc 17 has its inner face provided with recesses for receiving an annular group of friction elements or lugs 18, formed of cork or the like. The clutch further comprises a disc friction gear 19, having an inner flat friction face 19' to engage with the elements 18. The disc friction gear has a hub 20, preferably integral therewith and this hub and disc friction gear 19 are loosely mounted upon the shaft 13 to turn and move longitudinally upon the same. The power to drive the loom is applied to the disc friction gear 19, by means of a gear driven by a motor, not shown.

The bearing 14 has an opening 23 for rotatably receiving the end of the shaft 13, and the extreme end of this shaft is permanently retained spaced from the end wall of the opening 23, as shown at 23'. The bearing 14 is provided at its outer end with an annular recess 24 for holding an end thrust ball bearing unit 25, including race rings 26 and 27, having the bearing balls 28 arranged between them and carried by a spacer 29. The race ring 26 engages the inner wall of the recess 24, while the race ring 27 projects a slight distance beyond the bearing 14 to engage with the hub of the gear 16. This ball bearing unit is therefore securely retained within the recess 24 and permanently prevents the hub of the gear 16 contacting with the bearing 14 and preserves the space 23' at the end of the shaft 13. Slidably mounted upon the shaft 13 outwardly of the hub 20 of the disc friction gear 19 is a collar 30, to move longitudinally of the shaft 13 and to permit of the shaft rotating therein. This collar has an annular recess 31 for receiving an end thrust ball bearing unit 32, including race rings 33 and 34, slidable upon the shaft 13 and between which are arranged bearing balls 35, carried by a spacer 36. The collar 30 is provided with trunnions 37, as shown. The ball bearing unit 32 is securely held within the recess 31 and projects a slight distance beyond the recess to engage the hub 20.

Arranged adjacent to the collar 30 is a lever 38 having a yoke 39, provided with elongated openings 40 to receive the trunnions 37. This lever 38 is generally horizontal and has one end provided with a spherically curved recess 41 for receiving a spherical head 42 carried by a bolt 43, having screw-threaded engagement with the auxiliary support 15' or a part carried thereby. The head or pivot 42 is therefore horizontally adjustable to regulate the horizontal throw of the lever 38. An adjustable keeper 43' is provided for the lever 38, as shown.

The lever 38 is provided at its free end with a longitudinal slot 44', receiving a pin 44, mounted upon one end of a shipper sleeve 45, in turn slidably mounted upon a fixed guide rod 45'. The shipper sleeve 45 is moved in one direction by a compressible coil spring 46 and this coil spring acts against a stop collar 46', adjustably clamped upon the guide rod 45'. The spring 46 moves the shipper sleeve 45 to the right for swinging the lever 38 to the right to render the clutch inactive. The shipper sleeve 45 has a lug 47 rigidly secured thereto and a rod 48 is attached to the lug 47 and extends to the opposite side of the loom frame.

Arranged at the opposite side of the loom frame and rigidly mounted upon the frame side 9 is a horizontal transverse guide shaft 49, having a collar rigidly secured thereto. Slidable upon the guide shaft 49 is a shipper sleeve 51, having a lug 52 rigidly secured thereto and the rod 48 is attached to this lug. A toggle is provided including links 53 and 54. Link 54 is pivoted at 55 with the fixed collar 50 while link 53 is pivoted at 56 to the shipper sleeve 51. The free ends of the links 53 and 54 are pivotally connected by a bolt 57, having a forked head 58. The bolt 57 also passes through a yoke 59 and is pivotally connected therewith. This yoke is connected with a rod 60 which is pivoted at 61, to a shipper lever 62, which is pivoted at 63 to the frame side 9.

Slidably mounted on the frame side 9 near the shipper lever is a conventional frog 64, to be shifted by a dagger 65, when the shuttle fails to enter the shuttle box, as is well known. The frog is provided with an arm 66 having an opening 67 to receive a rod 68, carrying a nut 69. The rod 68 extends into the forked head 58 and it is pivotally connected therewith by a bolt 70. It is thus seen that the frog 64 is directly connected with the toggle and moves the toggle to break the same for releasing the clutch and also moving the shipper lever to the clutch releasing position. The frog may also engage and move the shipper lever 62, or parts connected therewith, thus directly moving the shipper lever, which in turn will break the toggle.

The operation of the apparatus is as follows:

When the toggle links 54 and 53 are in the straight or active position, they releasably lock in this position and the shipper sleeve 51 is shifted to the left. This pulls the rod 48 to the left and the shipper sleeve 45 is moved to the left, swinging the lever 38 to the left upon its pivot 42. This lever acts upon the sleeve 30, which is pressed against the ball bearing unit 32, which is pressed against the hub 20 of the disc friction gear 19 of the clutch. This disc friction gear is driven by the source of power and is brought into clamping engagement with the elements 18, whereby friction disc 17 turns with disc friction gear 19 as a unit. Friction disc 17 rotates gear 16, driving gear 12, in turn driving gear 11, and the crank shaft 10. The pressure against the friction disc 17 moves the gear 16 and shaft 13 inwardly slightly and causes the hub of the gear 16 to press against the ball bearing unit 25, which limits the inward movement of these parts, and maintains the space 23. When the elements 18 wear, it is necessary to adjust the throw of the lever 38, which is effected by adjusting the bolt 43 having the head or pivot 42. This is necessary because the throw of the rod 48 by the toggle is constant. The shipper lever is now in the running position and the disc friction gear 19 now drives the shaft 10 through the active clutch and associated elements. It is thus seen that the axial pressure or force from the sleeve 30 is applied directly to the ball bearing unit 32, which transmits the same directly to the hub 20. The sleeve 30 is held against rotation and there is relative rotary movement between the sleeve 30 and hub 20. The ball bearing unit permits of this relative rotary movement and eliminates the disadvantages encountered with fiber washers heretofore arranged between a shifting sleeve corresponding to the sleeve 30 and the hub 20. When fiber washers are used, one fiber washer usually remains non-rotatable with the sleeve while the other fiber washer rotates with the hub, and relative rotary motion occurs between the fiber washers. These fiber washers readily wear and require frequent renewal, and frequently overheat and become destroyed. If the pressure upon the fiber washers is excessive, caused by an improper adjustment of the pivot 42 of the lever 38, these fiber washers will overheat or burn rapidly, and if new fiber washers are substituted, without properly adjusting the pressure, the overheating will again immediately occur. By virtue of the ball bearing unit, these difficulties are overcome, and the ball bearing unit will last indefinitely and will not be injured by the improper adjustment of the pivot of the lever 38. The ball bearing unit 25 also takes the place of a fiber washer heretofore used in the space 23' to engage the end of the shaft 13. The end thrust ball bearing 25 has the advantages over this fiber washer as stated in connection with the end thrust bearing 32. A further advantage of the use of the end thrust ball bearings is that they eliminate the braking action produced by the fiber washers.

It is to be understood that the form of my invention herein shown and described is to be taken as a preferred example of the same and that various changes in the shape, size and arrangement of parts may be resorted to without departing from the spirit of the invention or the scope of the subjoined claims.

Having thus described my invention, what I claim is:

1. A stop mechanism for looms having protector mechanism including a movable frog, a driving clutch for the loom comprising coacting friction clutch elements, a movable member to move one friction clutch element axially, an end thrust ball bearing unit arranged between the movable member and the last named friction clutch element, a toggle connected with the movable member, and means operated by the frog to break the toggle.

2. A stop mechanism for looms having protector mechanism including a movable frog, a driving friction clutch for the loom comprising coacting friction clutch elements, a movable member to move one friction clutch element axially, an end thrust ball bearing unit arranged between the movable member and the last named friction clutch element, a lever to move the member, an adjustable pivot to regulate the throw of the lever, a toggle connected with the lever to control its action, and means operated by the frog to break the toggle.

3. A stop mechanism for looms having protector mechanism including a movable frog, said stop mechanism comprising a shaft, means for supporting the shaft, a driving friction clutch mounted upon the shaft comprising coacting friction clutch elements, a collar slidably mounted upon the shaft to move one friction clutch element axially, an end thrust ball bearing element mounted upon the shaft and arranged between the collar and the last named friction clutch element, a second end thrust ball bearing unit mounted upon the shaft and preventing the axial movement in one direction of the other friction clutch element, a lever pivotally connected with the collar, an adjustable pivot for the lever, a toggle connected with the lever, and means operated by the frog to break the toggle.

4. A stop mechanism for looms having protector mechanism including a movable frog, said stop mechanism comprising a shaft, means for supporting the shaft, a driving friction clutch mounted upon the shaft comprising coacting friction clutch elements, a collar slidably mounted upon the shaft to move one friction clutch element axially, an end thrust ball bearing unit mounted upon the shaft and arranged between the collar and the last named friction clutch element, a second end thrust ball bearing unit mounted upon the shaft and preventing the axial movement in one direction of the other friction clutch element, a lever pivotally connected with the collar, and means to move the lever and having its operation controlled by the frog.

5. A stop mechanism for looms having a crank shaft and protector mechanism including a movable frog, said stop mechanism comprising a shaft, a fixed bearing receiving one end of the shaft and having a recess, an end thrust ball bearing unit arranged within the recess and projecting outwardly beyond the same, a gear and friction disc mounted upon the shaft and rotating together, said gear having its end engaging the end thrust ball bearing unit, a disc friction gear loosely mounted upon the shaft for axial movement with relation to the friction disc, a collar mounted upon the shaft and having a recess, an end thrust ball bearing unit within the recess of the collar and projecting outwardly beyond the same to engage the end of the disc friction gear, means to move the collar axially upon the shaft and to hold the same against rotation, and means to actuate the last named means and having its operation controlled by the frog.

6. A stop mechanism for looms having protector mechanism including a frog, said stop mechanism comprising a shaft, means to support the shaft, a friction disc mounted upon the shaft, an end thrust ball bearing unit to oppose the movement of the friction disc in one direction, a disc friction gear slidably mounted upon the shaft, a collar receiving the shaft, an end thrust ball bearing unit between the collar and the disc friction gear, a pivoted lever connected with the collar to move it axially and to hold the collar against rotation, a spring to move the lever in one direction, a toggle connected with the lever, a shipper lever connected with the toggle, and means operated by the frog to break the toggle.

SAINT JULIAN GEDDINGS.